(12) United States Patent
Treadway

(10) Patent No.: US 7,514,482 B2
(45) Date of Patent: Apr. 7, 2009

(54) OPTICAL COATING COMPOSITION

(75) Inventor: Gerald D. Treadway, Penngrove, CA (US)

(73) Assignee: The Walman Optical Company, Minneapolis, MN (US)

( * ) Notice: Subject to any disclaimer, the term of this patent is extended or adjusted under 35 U.S.C. 154(b) by 36 days.

(21) Appl. No.: 11/188,549

(22) Filed: Jul. 25, 2005

(65) Prior Publication Data

US 2007/0021523 A1 Jan. 25, 2007

(51) Int. Cl.
*C08F 2/46* (2006.01)
*C07D 303/02* (2006.01)
*C08K 5/5435* (2006.01)
*C08K 5/54* (2006.01)
*C08K 5/541* (2006.01)

(52) U.S. Cl. .................... 522/170; 522/37; 522/83; 522/99; 522/84; 522/148; 522/168; 522/172; 522/178; 522/181; 522/182; 427/515; 528/25

(58) Field of Classification Search .................... 522/37, 522/83, 84, 99, 100, 148, 168, 170, 172, 522/178, 181, 182; 427/515; 528/25
See application file for complete search history.

(56) References Cited

U.S. PATENT DOCUMENTS

| | | | |
|---|---|---|---|
| 4,000,115 A | 12/1976 | Jacobs | |
| 4,058,401 A | 11/1977 | Crivello | |
| 4,069,055 A | 1/1978 | Crivello | |
| 4,101,513 A | 7/1978 | Fox et al. | |
| 4,161,478 A | 7/1979 | Crivello | |
| 4,348,462 A | 9/1982 | Chung | |
| 4,378,250 A | 3/1983 | Treadway | |
| 4,486,504 A | 12/1984 | Chung | |
| 5,221,560 A | 6/1993 | Perkins | |
| 5,385,955 A | 1/1995 | Tarshiani | |
| 5,468,789 A | 11/1995 | Lewis | |
| 5,789,082 A | 8/1998 | Treadway | |
| 5,907,000 A | 5/1999 | Treadway | |
| 6,100,313 A | 8/2000 | Treadway | |
| 6,250,760 B1 | 6/2001 | Treadway | |
| 6,326,054 B1 | 12/2001 | Smith et al. | |
| 6,780,232 B2 | 8/2004 | Treadway | |
| 7,037,585 B2 | 5/2006 | Treadway | |

FOREIGN PATENT DOCUMENTS

| | | |
|---|---|---|
| EP | 1144486 | 11/2004 |
| WO | WO9745498 | 12/1997 |
| WO | WO0200561 | 1/2002 |

*Primary Examiner*—Sanza L McClendon
(74) *Attorney, Agent, or Firm*—Fredrikson & Byron, P.A.

(57) ABSTRACT

Coating compositions yielding cured coatings that exhibit excellent abrasion-resistance and hardness for use on polymeric substrates such as the front side of optical lenses, in a manner that meets or exceeds the stringent requirements for such use. The compositions include the hydrolysis product of an epoxy functional alkoxy silane, a viscosity-reducing amount up to 50% by weight, solids basis, of a monomeric (silanol free) epoxy functional epoxy silane, and colloidal silica present in an amount sufficient to improve abrasion resistance as compared to a composition lacking the colloidal silica.

25 Claims, No Drawings

OPTICAL COATING COMPOSITION

TECHNICAL FIELD

This invention relates to the field of coatings for transparent objects such as eyeglass lenses, and refers particularly to coating compositions having low viscosities and to coating compositions producing abrasion-resistant coatings with highly abrasion resistant coatings.

BACKGROUND OF THE INVENTION

Transparent plastic materials such as eyeglass lenses are subject to becoming dull and hazy due to scratching and abrasion during use. Polycarbonate eyeglass lenses, for example, are strong and shatter resistant but also are relatively soft and susceptible to scratching. Television screen face plates similarly are made of flexible, shatter resistant plastic materials such as polycarbonate and poly (methylmethacrylate), and these also can be scratched or abraded.

Various coatings have been proposed for eyeglasses and other transparent plastic materials to reduce their propensity to become scratched and abraded. Besides being abrasion resistant, coatings for eyeglass lenses are often capable of being tinted by treatment with a dye which becomes incorporated in the coating. As a general observation, the tintability of a coating tends to decrease as its hardness and scratch resistance increases, and vice-versa.

Coating compositions of the type used to provide coatings on such substrates as polycarbonate eye glass lenses desirably are of low viscosity. Moreover, as noted earlier, they are also desirably capable, upon curing, of forming surfaces that on the one hand are hard and scratch-resistant and on the other hand are tintable, that is, are capable of readily accepting tinting dyes.

Applicant has previously described improved coating compositions that can be used for providing various features. See, U.S. Pat. Nos. 5,789,082, 5,907,000, 6,100,313, and 6,780,232, the disclosures of which are incorporated herein by reference. In particular, U.S. Pat. No. 6,780,232 describes a composition that includes the use of both hydrolyzed and partially hydrolyzed silanes, though the composition itself is described as being preferably free of silica and other colloids.

See also U.S. Pat. No. 4,486,504 (assigned to GE) which describes an ultraviolet radiation-curable silicone coating composition which, when applied to a solid substrate, is said to provide an abrasion-resistant coating firmly adhered thereon. The silicone coating composition is said to be free of residual solvent and free of toxic hydroxy acrylates, and prepared from the hydrolysis products of acryloxy-functional silanes and/or glycidoxy-functional silanes, colloidal silica and a photoinitiator.

See also, U.S. Pat. No. 5,385,955 (assigned to Essilor) which describes a thermally cured coating composition for ophthalmic lens which comprises a mixture of a monoepoxysilane, colloidal silica, an alkylalkoxysilane or tetraalkoxysilane, and an ultraviolet activated photoinitiator capable of initiating a cationic cure of such composition. The photoinitiator is an aromatic onium salt or an iron arene salt complex.

Finally, see WO 97/45498 (Ho, et al.) which describes what are described as being highly tintable, abrasion resistant coatings prepared from compositions that comprise a base resin that does not contain non-silylated acrylate monomer, a tint-enhancing quantity of a quaternary ammonium sale, and a crosslinking agent.

What is clearly needed is are compositions suitable for use on materials such as transparent polymeric substrates, including the front side of eyeglass lenses, though having abrasion resistance that is at least as good as, if not significantly better than that provided by compositions currently available or previously described.

SUMMARY OF THE INVENTION

The present invention provides coating compositions yielding cured coatings that exhibit excellent abrasion-resistance and hardness. The compositions preferably are of low viscosity and most preferably are substantially free of volatile solvents. Compositions of this invention can be used on polymeric substrates such as the front side of optical lenses, in a manner that meets or exceeds the stringent requirements for such use.

In a preferred embodiment, the present invention provides a coating composition for forming a transparent, abrasion-resistant coating upon a substrate, the composition comprising:

A. the hydrolysis product of an epoxy functional alkoxy silane,

B. a curing agent comprising a cationic photoinitiator for polymerizing epoxy compounds, C. a viscosity-reducing amount up to 50% by weight, solids basis, of a monomeric (silanol free) epoxy functional epoxy silane, and D. colloidal silica present in an amount sufficient to improve abrasion resistance as compared to a composition lacking the colloidal silica.

Optionally, and preferably, the composition further comprises one or more monomeric components. Preferred monomeric components are adapted to permit the formation of an interpenetrating network. In such an embodiment, the composition preferably comprises:

E. a polymerizable monomer (and corresponding initiators where need be) selected from the group consisting of one or more of the following, including combinations thereof:
 1. ethylenically unsaturated monomers (e.g., vinyls, (meth)acrylates)
 2. non-silane epoxies (e.g., epoxy ethers)
 3. oxetanes
 4. alkylalkoxysilanes and/or tetraalkoxysilanes)
 5. vinyl ethers
 6. non-silane cycloaliphatic epoxies Also optionally, the composition further comprises:

F. a silane coupling agent, preferably comprising methyltrimethoxysilane (MTMS).

In a preferred embodiment, the composition is prepared by providing and blending together parts A, C and D, typically followed by distillation to remove solvents, after which a cationic initiator B can be incorporated and the composition can be photocured. For instance, a preferred method of preparing the composition includes:

1) hydrolysis of an epoxyalkoxysilane, after which volatile solvents are stripped under vacuum (e.g., at 25-100C);

2) providing colloidal silica in an alcohol solution, and treating the solution with alkoxysilane and water at 25-75C to produce a colloidal silica-alkoxy siloxane reaction product;

3) mixing the reaction products from steps 1) and 2) with unhydrolyzed epoxyalkoxysilane, and removing volatiles under vacuum at 50-80C, and 4) mixing the reaction product from step 3) with photoinitiators and flow control agents, and optionally also with various desired diluents, such as acrylic monomers, non-silane epoxies, vinyl ethers, oxetanes or combinations thereof.

The ethylenically unsaturated monomer, when present and in the form of preferred monomer of component E, preferably comprises an acrylic monomer, and more preferably an acrylic monomer having an acrylic functionality of not more than two. Inclusion of a monomeric (silanol free) epoxy functional epoxy silane in the coating composition enables a substantial reduction in the viscosity of the composition to be achieved, without loss of abrasion resistance. Amounts of the monomeric silane sufficient to significantly reduce viscosity of the coating composition up to about 50% by weight, solids basis, are used.

Applicants have discovered the manner in which improved abrasion resistance, and optionally, tintability as well. Previous application provided both features, but excluded the inclusion of silica, finding such compositions with silica were less stable.

DETAILED DESCRIPTION

Compositions of this invention provide improved properties as compared to compositions previously described for use in coating polymeric surfaces, and particularly polymeric optical lenses. In particular, the present compositions provide improved abrasion resistance. For use on optical lenses, for instance, preferred compositions of this invention can be used to provide "delta haze" (i.e., change in haze) values (at 1000 cycles using a 500 g load) of on the order of less than about 10%, preferably less than about 5%, and even more preferably less than about 2%, as determined in the manner described in the Examples below.

In addition to such improved abrasion resistance, preferred compositions can provide acceptable tintability, e.g,. preferably down to 30% transmission r less, more preferably down to 20% transmission or less, and even more preferably down to 17% or less (e.g., after immersion in a dye bath for 15 minutes as described in Example 2 below, and determined using spectrophotometric Hazegard system (XL-211) available from BYK Gardner).

In contrast, comparative examples are provided below to demonstrate that compositions having components A, B and C above, together with polymerizable monomers (equivalent to components E2 and E5 above), but lacking colloidal silica of the present invention, provide increased tintability, but haze values of on the order of 11.3 to 11.6 (comparative example 2), and 9.4 to 9.8 (comparative example 3).

Also by comparison, compositions such as those described in above-captioned U.S. Pat. No. 5,221,560 (Perkins, et al.) are said to provide Taber abrasion values of 6.4 (Perkins et al., Example 4) and 7 (Perkins, et al., Example 7), using CS-10F wheels (which are softer than those exemplified below). The exemplified compositions do not include a silane monomer of the type presently described and claimed, but do include $SiO_2$ concentrations that can be calculated as 22.5% weight concentration (solids basis). Moreover, and in further contrast to compositions of the present invention, the compositions described in the '560 patent are prepared in a manner that includes solvents.

By further comparison, General Electric's U.S. Pat. No. 4,348,462 exemplifies compositions that provide haze values of 1.7 to 2.6, based on compositions that include $SiO_2$ concentrations that can be calculated as 24.85% weight concentration (solids basis), but that again do not include silane monomers of the present invention. The '462 patent itself also describes the manner in which compositions that contain non-silyl acrylates are known to be hazardous and dangerous to work with.

Compositions of the present invention include the following ingredients.

A. Hydrolysis Product of Epoxy Functional Alkoxysilane

In coating compositions of the invention, the epoxy functional alkoxy silane precursor of the at least partially hydrolyzed polymerizable ingredient is preferably an epoxyalkylalkoxysilane of the following structure:

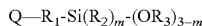

wherein $R_1$ is a $C_1$-$C_{14}$ alkylene group, $R_2$ and $R_3$ independently are $C_1$-$C_4$ alkyl groups, Q is a glycidoxy or epoxycyclohexyl group, and m is 0 or 1. The alkoxy groups are at least partially hydrolyzed to form silanol groups with the release of the $R_3OH$ alcohol, and some condensation of the silanol groups occurs. Epoxy reactivity is preserved, however.

Many epoxy functional alkoxysilanes are suitable as hydrolysis precursors, including glycidoxymethyl-trimethoxysilane, glycidoxymethyltriethoxysilane, glycidoxymethyl-tripropoxysilane, glycidoxymethyl-tributoxysilane, β-glycidoxyethyltrimethoxysilane, β-glycidoxyethyltriethoxysilane, β-glycidoxyethyl-tripropoxysilane, β-glycidoxyethyl-tributoxysilane, β-glycidoxyethyltrimethoxysilane, α-glycidoxyethyl-triethoxysilane, α-glycidoxyethyl-tripropoxysilane, α-glycidoxyethyltributoxysilane, γ-glycidoxypropyl-trimethoxysilane, γ-glycidoxypropyl-triethoxysilane, γ-glycidoxypropyl-tripropoxysilane, γ-glycidoxypropyltributoxysilane, β-glycidoxypropyl-trimethoxysilane, β-glycidoxypropyl-triethoxysilane, β-glycidoxypropyl-tripropoxysilane, β-glycidoxypropyl-tributoxysilane, α-glycidoxypropyl-trimethoxysilane, α-glycidoxypropyl-triethoxysilane, α-glycidoxypropyl-tripropoxysilane, α-glycidoxypropyltributoxysilane, γ-glycidoxybutyl-trimethoxysilane, δ-glycidoxybutyl-triethoxysilane, δ-glycidoxybutyl-tripropoxysilane, δ-glycidoxybutyl-tributoxysilane, δ-glycidoxybutyl-trimethoxysilane, γ-glycidoxybutyl-triethoxysilane, γ-glycidoxybutyl-tripropoxysilane, γ-propoxybutyl-tributoxysilane, δ-glycidoxybutyl-trimethoxysilane, δ-glycidoxybutyl-triethoxysilane, δ-glycidoxybutyl-tripropoxysilane, α-glycidoxybutyl-trimethoxysilane, α-glycidoxybutyl-triethoxysilane, α-glycidoxybutyl-tripropoxysilane, α-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexy) butyl-triethoxysilane, (3,4-epoxycyclohexyl)-butyl-tripropoxysilane, and (3,4-epoxycyclohexyl)butyl-tributoxysilane. A particularly preferred epoxyalkylalkoxysilane is γ-glicidoxypropyl trimethoxy silane due to its wide commercial availability.

Hydrolysis of the epoxy functional alkoxysilane precursor may occur in an acidic environment, and reference is made to U.S. Pat. No. 4,378,250, the teachings of which are incorporated herein by reference. Hydrolysis of the alkoxy groups liberates the associated alcohol (which may be stripped off) to form silanol groups, which in turn are relatively unstable and tend to condense spontaneously. Hydrolysis of the alkoxysilane can be complete or incomplete, and preferably, the alkoxysilane is reacted with a stoichiometricly sufficient quantity of water to hydrolyze at least 50% of the alkoxy groups and most preferably from about 60% to about 70% of the alkoxy groups. For the hydrolysis of an epoxy functional trialkoxy silane, good results have been obtained by reacting the silane with a stoichiometricly sufficient quantity of water to hydrolyze two-thirds of the alkoxy groups.

The hydrolyzed epoxy functional silane component is present in the coating compositions of the invention at a weight concentration (solids basis) of about 10% to about 75%, and preferably about 20% to about 50%.

B. Cationic Initiator

Useful cationic initiators for the purposes of this invention include the aromatic onium salts, including salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate and triphenylsulfonium hexafluoroantimonate, and salts of Group VIIa elements, such as iodonium salts such as diphenyliodonium chloride and diaryl iodonium hexafluoroantimonate, the latter being preferred. The aromatic onium salts and their use as cationic initiators in the polymerization of epoxy compounds are described in detail in U.S. Pat. No. 4,058,401, "Photocurable Compositions Containing Group VIA Aromatic Onium Salts," by J. V. Crivello issued Nov. 15, 1977; U.S. Pat. No. 4,069,055, "Photocurable Epoxy Compositions Containing Group VA Onium Salts," by J. V. Crivello issued Jan. 17, 1978, U.S. Pat. No. 4,101,513, "Catalyst For Condensation Of Hydrolyzable Silanes And Storage Stable Compositions Thereof," by F. J. Fox et al. issued Jul. 18, 1978; and U.S. Pat. No. 4,161,478, "Photoinitiators," by J. V. Crivello issued Jul. 17, 1979, the disclosures of which are incorporated herein by reference.

Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115, "Photopolymerization Of Epoxides," by Sanford S. Jacobs issued Dec. 28, 1976, the disclosure of which is incorporated herein by reference. Preferred cationic initiators for use in the compositions of this invention are the salts of Group VIa elements and especially the sulfonium salts, and also the Group VIIa elements, particularly the diaryl iodonium hexaflurorantimonates. Particular cationic catalysts include diphenyl iodonium salts of tetrafluoro borate, hexafluoro phosphate, hexafluoro arsenate, and hexafluoro antimonate; and triphenyl sulfonium salts of tetrafluoroborate, hexafluoro phosphate, hexafluoro arsenate, and hexafluoro antimonate.

C. Monomeric Silane

The composition of this invention further comprises the monomeric (silanol free) epoxy functional epoxy silane, which can also be referred to as an unhydrolyzed epoxy functional alkoxy silane. In turn, the composition includes both hydrolyzed and unhydrolyzed epoxy functional alkoxy silanes, with the latter being present in an amount sufficient to reduce the viscosity of the composition itself. It is noted that, while the "hydrolysis product" of such a silane can certainly include compounds that are themselves partially hydrolyzed (depending on the mole ratio of water to alkoxy groups as described herein), an unhydrolyzed silane of the sort claimed is clearly one that is prepared and used in the substantial absence of water. As described herein, water is removed from the hydrolysis product component, prior to the addition of an unhydrolyzed component, in order to permit the latter to retain its unhydrolyzed nature. See, for instance, the examples below in which the partially hydrolyzed component is stripped of volatiles (including water) prior to being combined with the unhydrolyzed component. Hence, when and to the extent "partially hydrolyzed" silanes might be discussed in the art, these compounds are different than, and not at all suggestive of the use of both hydrolyzed and unhydrolyzed silane components as presently claimed. Instead, the term "partially hydrolyzed" relates to only the hydrolysis product component (and then, one in which the silane is hydrolyzed by less than one mole of water per mole of alkoxy groups).

In turn, the composition desirably includes an effective amount up to about 50% by weight, solids basis, of a suitable non-hydrolyzed epoxy functional alkoxy silanes, including those selected from the silanes listed above. The non-hydrolyzed epoxy functional alkoxy silane desirably is present in an amount not less than about 10%, preferably at least about 20%, and most preferably from about 40% to about 50% by weight, solids basis. Preferably, the epoxy functional alkoxy silane that is included as the non-hydrolyzed component also is employed to make the hydrolyzed component. It should be understood that the hydrolyzed and non-hydrolyzed components may be different and each may utilize one or a blend of different epoxy functional alkoxy silanes, as desired.

D. Colloidal Silica

The colloidal silica component of the present composition can be provided in any suitable form. Suitable colloidal silicas for use in a composition of this invention provide an optimal combination of such properties as size, uniformity, availability and cost, and are generally provided in the form of a silicon dioxide ($SiO_2$) dispersed in solvents (e.g., alcohols). Colloidal silica is available in basic or acidic form. Either may be utilized; however, the acidic form (low sodium content) is preferred.

Examples of suitable silicas are commercially available, for instance as the organosilicasol line available from Nissan Chemical Industries, Inc. (Osaka JP), including types "MA-ST" and "IPA-ST", both containing SiO2 (30 wt %, 0.01 microns), dispersed in methanol and isopropanol, respectively. Such silicas are available in a variety of size ranges, and most preferably are used in a range of about 5 nanometers to about 20 nanometers.

Colloidal silica is preferably used in a final amount sufficient to improve abrasion resistance as compared to a composition lacking the silica. In preferred embodiments, the colloidal silica can be used in an amount between about 1% and about 50% by weight, based on the weight of the final composition, preferably between about 2% and about 30% and more preferably between about 5% and about 20%.

In turn, the abrasion resistance (delta haze) of a composition of this invention is preferably less than about 10% (when determined by Taber resistance, at 1000 cycles with a 500 g load), more preferably less than about 5%, and most preferably less than about 2%. By comparison, compositions lacking the colloidal silica generally provide abrasion resistant in the range of about 10% to about 20% or more. The abrasion resistance of a composition of this invention also compares quite favorably with commercial coating compositions such as those sold under the Ultra Optics Product Nos. UV200 and UV-NV.

E. Polymerizable Monomer

1. Ethylenically unsaturated monomers (e.g., vinyls, (meth)acrylates)

A wide variety of ethylenically unsaturated monomers (including oligomers) can be employed in the coating composition of the invention, and acrylic monomers and oligomers, particularly those having acrylic functionalities of not greater than two, are preferred. Useful acrylic compounds for improving adhesion to polycarbonate substrates include both mono and di-functional monomers, but other or additional polyfunctional acrylic monomers may also be included.

Examples of monofunctional acrylic monomers include acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Examples of polyfunctional acrylic monomers, including both difunctional and tri and tetrafunctional monomers, include neopentylglycol diacrylate, pentaerythritol triacrylate, 1,6-hexanediol diacrylate, trimethylolpropane triacrylate, tetraethylene glycol diacrylate, 1,3-butylene glycol diacrylate, trimethylolpropane trimethacrylate, 1,3-butylene glycol dimethacrylate, ethylene glycol dimethacrylate, pentaerythritol tetraacrylate, tetraethylene glycol dimethacrylate, 1,6-hexanediol dimethacrylate, ethylene glycol diacrylate, diethylene glycol diacrylate, glycerol diacrylate, glycerol triacrylate, 1,3-propanediol diacrylate, 1,3-propanediol dimethacrylate, 1,2,4-butanetriol trimethacrylate, 1,4-cyclohexanediol diacrylate, 1,4-cyclohexanediol dimethacrylate, pentaerythritol diacrylate, 1,5-pentanediol dimethacrylate, and the like. The acrylic-functional monomers and oligomers desirably are employed at a weight concentration of at least about 10% by weight, preferably from about 10% to about 50%, and most preferably from about 10% to about 25%, all on a solids basis.

As initiators for the ethylenically unsaturated monomers, photoactivated free-radical initiator are preferred, although thermally activated free radical initiators may also be used. Useful photoinitiators for this purpose are the haloalkylated aromatic ketones, chloromethylbenzophenones, certain benzoin ethers, certain acetophenone derivatives such as diethoxyacetophenone and 2-hydroxy-2-methyl-1-phenyl-propan-1-one. A preferred class of free-radical photoinitiators is the benzil ketals, which produce rapid cures. Suitable photoinitiators include α,α-dimethoxy-α-phenyl acetophenone (Iragacure™ 651), and 2-hydroxy-2-methyl-1-phenyl-propan-1-one (Darocure™ 1173, Ciba-Geigy Corporation). A preferred photoiniator is 1-hydroxycyclohexyl phenyl ketone (available as Irgacure 184). Specific examples of photoinitiators include ethyl benzoin ether, isopropyl benzoin ether, dimethoxyphenyl acetophenone, diethoxy acetophenone, and benzophenone. Other examples of suitable initiators are diethoxy acetophenone ("DEAP", First Chemical Corporation) and 1-benzoyl-1-hydroxycyclohexane ("Irgacure 184", Ciba Geigy).

E.2-5 Examples of suitable monomers of the remaining types E2-E5 include, but are not limited to the following:

E2. non-silane epoxies (e.g., epoxy ethers), including aliphatic polyol polyepoxy resins such as those sold under the tradename "Heloxy Modifier 48" and available from Resolution Peformance Products (Houston, Tex.).

E3. oxetanes-di[1-ethyl(3-oxetanyl)]methyl ether, produced as "OXT-221" by Toagosei Co. Ltd.

E4. alkylalkoxysilanes or tetraalkoxysilanes, such as tetraethoxysilane (also known as silicon tetraethoxide, tetraethylorthosilicate, and tetraethyl silicate), as available from Gelest, Inc. (Morrisville, Pa).

E5. vinyl ethers such as 1,3-benzenedicarboxylic acid, bis-[4-(ethenyloxy)butyl]ester, Bis(4-vinyloxybutyl)isophthalate (available as Vectomer 4010 Vinyl Ether from Morflex, Inc.) and the divinyl ether of 1,4 cyclohexane dimethanol (available as "Rapi-Cure CHVE" from ISP(Canada), Inc.

E6. non-silane cycloaliphatic epoxies, including cycloaliphatic epoxide resins such as those sold under the tradename Uvacure, such as Uvacure 1502 included within the Radcure line of resins available from UCB Group.

F. Silane Coupling Agent

In a further, and preferred embodiment, the composition of this invention optionally also includes the use of a silane coupling agent. The use of such an agent provides desirable properties, particularly in terms of increased compatability of the silican component with the remaining composition.

Suitable silane coupling agents provide an optimal combination of such properties as compatability, low viscosity (e.g., liquid at room temperature), the ability to improve adhesive and/or flexibility characteristics without undue impact on hardness or abrasion resistance, and the ability to react in a composition of this invention to provide a clear cured composition.

Examples of suitable silane coupling agents include, but are not limited to the following, available from AP Resources Company: Methyltrimethoxysilane (MTMS); Tetraethoxysilane (TEOS); Tetramethoxysilane (TMOS); Vinyltriethoxysilane; and Vinyltrimethoxysilane Optional Surfactants:

Polyalkylene oxide modified polydimethylsiloxanes, as an example, may have the formula:

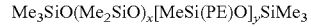

where Me is methyl and PE is $—(CH_2)_3O(EO)_m(PO)_nZ$. Here, These surfactants are referred to as "AP" (alkyl-pendant) types. Other polyalkylene oxide modified siloxanes may have the general formula $(MeSi)_{y-2}[(OSiMe_2)_{x/y}O-PE]_y$, where PE is $—(EO)_m(PO)_nR$, R being lower alkyl. The latter surfactants are referred to as the "AEB" (alkoxy endblocked) typeIn these general formulas, EO represents ethyleneoxy, PO represents 1,2-propyleneoxy, Z is H or lower alkyl, and x, y, m and n can vary as desired.

A series of polyalkylene oxide modified siloxane surfactants as thus described are available from Witco Corporation under its registered trademark SILWET. Alkoxypolyalkylene oxyethanols, and the substituted polyglycols such as nonylphenol polyethylene glycol, are generally available from Union Carbide Corporation under its registered trademark TERGITOL.

The amount of surfactant to be used in a coating composition is the amount which provides the desired tintability to cured coatings derived from the composition, and this amount may range from a minimum amount—usually a percent or two by weight—that provides noticeable improvement in tintability up to about 10% by weight or more. Amounts of surfactant in the range of about 1% to about 10% by weight of the composition are usually appropriate, and surfactant concentrations of about 4% have given good results.

The invention may be more readily understood by reference to the following illustrative, non-limiting examples. In these examples, tintability is measured as follows: A coated and cured sample is immersed in BPI Black Dye (Brain Power Inc.) at 95° C.-100° C. for 15 minutes and then rinsed with water and dried. The transmissivity T of the sample is measured spectrophotometrically, and tintability is reported as percentage transmissivity. Resistance to abrasion may be measured by abrading the coated surface of a transparent substrate under predetermined conditions and measuring the haze that is formed as a reduction in light transmissivity. One such testing apparatus is referred to as a Taber Abrader, a product of Byk-Gardner. Abrasion resistance testing with this equipment may be performed in accordance with ASTM D 1044-78. The particular equipment employed for testing coatings referred to below involved a model 5130 Taber abrader equipped with a CS10 abrasive wheel weighted at 500 grams.

The invention will be further described by reference to the following, non-limiting Examples.

EXAMPLES

Comparative Example 1

Preparation of Epoxy Base Compositions

Epoxy base #1: A partially hydrolyzed epoxy-functional alkoxysilane is prepared by combining 236 g. of γ-glycidoxypropyltrimethoxysilane, 36 g of water and 0.5 ml of a 1% HCl solution and mixing for 16-20 hours. The resulting product is stripped of volatiles under vacuum.

Epoxy base #2: A second partially hydrolyzed epoxy—functional alkoxysilane is prepared by combining 246 g of epoxy cyclohexylethyltrimethoxysilane, 18 g of water, 20 g of ethanol and 0.2 g of an acidic functional ion exchange resin (CT 275, Purolite Corp.). The mixture is stirred at room temperature for 36-40 hours, and then is stripped of volatiles under vacuum.

Comparative Example 2

Two coating compositions, labeled A and B, were prepared by blending together the following ingredients, amounts being given in grams. The viscosity of the compositions were measured and compositions were coated on polycarbonate lenses and UV cured using a medium pressure mercury bulb, 250 watts/inch. The coated lenses were subjected to the Taber Abrasion test described above.

| Ingredient | A | B |
|---|---|---|
| Butane diol diacrylate | 8.0 | 8.0 |
| Cyclohexane dimethanol divinylether | 2.0 | 2.0 |
| Trimethylolpropane triglycidyl ether | 7.5 | 7.5 |
| Epoxy base #1 | 9.5 | 5.5 |
| γ-glycidoxypropyltrimethoxysilane (not hydrolyzed) | 0.0 | 5.0 |
| Triarylsulfonium hexafluorphosphate (Cyracure 6990, Union Carbide) | 0.64 | 0.66 |
| Triarylsulfonium hexafluoroantimonate (Cyracure 6974, Union Carbide) | 0.64 | 0.64 |
| 2-hydroxy-2-methyl-1-phenyl propan-1-one (Darocure1173, Ciba-Geigy Corporation) | 0.8 | 0.8 |
| Ebecryl 350 (silicone flow control agent, UCB Chemicals Corp.), | 0.4 | 0.4 |
| Viscosity, cps | 32 | 11 |
| Taber abrasion, % haze, 200 cycles | 11.3-11.6 | 11.3-11.4 |

Note should be made that the viscosity of Composition B was approximately one-third the viscosity of comparative Composition A Comparative Example 3

Three coating compositions, labeled C, D and E, were prepared by blending together the following ingredients, amounts being given in grams. The viscosity of the compositions were measured and compositions were coated, cured and tested as in Example 2.

| Ingredient | C | D | E |
|---|---|---|---|
| Epoxy base #1 | 7.6 | 7.6 | 7.6 |
| Hexane diol diacrylate | 6.4 | 5.2 | 6.4 |
| Cyclohexane dimethanol divinylether | 1.6 | 1.6 | 1.6 |
| Epoxy cyclohexylethyl trimethoxy silane (monomeric) | 6.0 | 2.0 | 4.0 |
| Epoxy base #2 | 0.0 | 4.0 | 2.0 |
| 1/1 mix of benzophenone and 1-hydroxy cyclohexylphenyl ketone | 0.6 | 0.5 | 0.6 |
| Mixed Triarylsulfonium Hexafluoroantimonate salts, 50% in Propylene Carbonate (UVI 6974, Union Carbide) | 1.2 | 1.2 | 1.2 |
| Ebecryl 350 | 0.2 | 0.2 | 0.2 |
| Viscosity, cps | 12.0 | 26 | 22 |
| Taber abrasion, 200 cycles, % haze | 9.8 | 9.4 | 9.6 |

Comparative Example 4

A base composition was prepared by blending the following ingredients, amounts being given in grams:

| | |
|---|---|
| Glycidoxypropyltrimethoxysilane, partially hydrolyzed as in Example 1 | 36 |
| Glycidoxypropyltrimethoxysilane, unhydrolyzed | 50 |
| Hexane diol diacrylate | 15 |
| Pentaerythritol triacrylate | 5.0 |
| 1/1 mix of benzophenone and 1-hydroxy cyclohexylphenyl ketone | 1.8 |
| Diaryliodonium hexafluorophosphate (CD 1012, Sartomer Corp) | 4.0 |

The resulting base composition was divided into 10 g aliquots, and to each aliquot was added 0.4 g of one of the surfactants listed below, and the compositions were spin-coated on polycarbonate lenses and cured under UV light to form coating thicknesses in the range of 8 to 10 microns. The tintability of each lens was measured as described above.

| Surfactant | Water Solubility | Tintability (% T) |
|---|---|---|
| SILWET L-77 (polyalkylene oxide-modified heptamethyltrisiloxane, 700 mol. wt., AP type) | Dispersible | 27.7 |
| SILWET L-722 (polyalkylene oxide-modified dimethylsiloxane, 3000 mol. wt., AEB type) | Insoluble | 26.2 |
| SILWET L-7001 (polyalkylene oxide-modified dimethylsiloxane, 20,000 mol. wt., AP type) | Partially soluble | 26.2 |
| SILWET L-7500 (polyalkylene oxide-modified dimethylsiloxane, 3,000 mol. wt., AP type) | Partially soluble | 35.4 |
| SILWET L-7604 (polyalkylene oxide-modified dimethylsiloxane, 4,000 mol. wt., AP type) | Soluble | 26.4 |
| SILWET L-7607 (polyalkylene oxide-modified dimethylsiloxane, 1,000 mol. wt., AP type) | Soluble | 27.7 |
| SILWET L-7607 (polyalkylene oxide-modified dimethylsiloxane, 10,000 mol. wt., AP type) | Insoluble | 29.4 |
| TERGITOL S-3 (alkyloxypolyethyleneoxyethanol, mol. wt. 332) | Insoluble | 26.4 |
| TERGITOL S-5 (alkyloxypolyethyleneoxyethanol, mol. wt. 420) | Dispersible | 28.4 |
| TERGITOL S-7 (alkyloxypolyethyleneoxyethanol, mol. wt. 508) | Soluble | 29.0 |
| TERGITOL NP-4 (nonylphenol polyethylene glycol ether, mol. wt. 396) | Insoluble | 27.0 |
| TERGITOL NP-6 (nonylphenol polyethylene glycol ether, mol. wt. 484) | Dispersible | 33.5 |

| Surfactant | Water Solubility | Tintability (% T) |
|---|---|---|
| TERGITOL NP-6 (nonylphenol polyethylene glycol ether, mol. wt. 528) | Dispersible | 27.9 |
| TERGITOL NP-15 (nonylphenol polyethylene glycol ether, mol. wt. 880) | Soluble | 27.3 |

While preferred embodiments of the invention have been described, it should be understood that various changes, adaptations and modifications may be made therein without departing from the spirit of the invention or the scope of the appended claims.

| | Working Examples 1-10 | |
|---|---|---|
| INGREDIENTS KEY | (product name, chemical description, source): | |
| A187 | Glycidoxy propyl trimethoxy silane (GE Silicones) | |
| A186 | Epoxy Cyclohexyl Trimethoxy Silane (GE Silicones) | |
| A 1630 | Methyl trimethoxy silane (Crompton Corp) | |
| SR 9209 | alkoxylated aliphatic diacrylate (Sartomer, Inc.) | |
| SR 444 | pentaerythritol triacrylate (Sartomer, Inc.) | |
| SR-351 | trimethylolpropane triacrylate (TMPTA, Sartomer, Inc.) | |
| SR-238 | 1,6 hexanediol diacrylate (HDODA, Sartomer, Inc.) | |
| DEAP | 2,2-diethoxy acetophenone, free radical initiator (First Chemical Corporation) | |
| Cyracure 6974 | Cationic photoiniator (Dow Chemical) | |
| Irgacure 184 | Free radical photoiniator (Ciba Geigy) | |
| Irgacure 250 | Cationic photoiniator (Ciba Geigy) | |
| Uvacure 1502 | Cycloaliphatic epoxy resin (UCB Chemicals Corp) | |
| Cyracure UVR 6000 | 3-Ethyl-3-(hydroxymethyl)oxetane (Dow Chemical) | |
| OXT-221 | bis[1-ethyl(3-oxetanyl)]methyl ether (Toagosei, Ltd) | |
| BYK 307 | Silicone type flow control agent (BYK - Chemie) | |
| MA-ST | 30% Colloidal silica in methyl alcohol (Nissan Chemical) | |
| Vectomer | Vinyl ether (Morton Chemical) | |
| Heloxy Modifier 48 | aliphatic polyol polyepoxy resin (Revolution Performance) | |

Example 1

Preparation of Base Resin (epoxy functional inorganic/organic hybrid)

The following ingredients were mixed with stirring for either 2 hours at 50-60C or for 18-20 hrs at room temperature in a flask equipped with a condenser, after which volatiles were removed under reduced pressure to provide a stripped, hydrolyzed silane component as "Resin A".

| Resin A | Ingredient | Amount (g) |
|---|---|---|
| | Non-hydrolyzed silane (A187) | 1000 |
| | H$_2$O | 141 |
| | 10% HCl | 5.4 |

A second composition (Resin B) was prepared to provide silane treated colloidal silica, by mixing colloidal silica and silane in a flask fitted with a condenser for 18-20 hrs at room temperature. The ingredients were reacted under conditions suitable to hydrolyze silane groups to form corresponding silanol groups, thereby forming a covalent inorganic/organic hybrid SiO$_2$:

| Resin B | Ingredient | Amount (g) |
|---|---|---|
| | Colloidal silica (MA-ST) | 605 |
| | Silane coupling agent (A1630) | 18.2 |
| | H$_2$O | 4.8 |

Resin A and additional silane were added to the above-described preparation of Resin B in the amounts shown below, and the pH was adjusted to 7.5-8 with concentrated NH$_4$OH:

| Resin A | 535.4 g |
|---|---|
| Non-hydrolyzed silane (A187) | 586.6 g |

The resulting composition was blended by stirring in a flask equipped with a condenser, after which volatiles were removed at 50-60C under reduced pressure to provide the "base resin" referred and further exemplified below. Viscosity of the final composition was very low (approx. 17.5 cps.) when determined using a Brookfield LVF Viscometer at 25C.

The final product was a low viscosity (e.g., <20 cps), clear resin, which could be stored at room temperature or frozen until further use.

Example 2

Base Resin Without Added Monomer

The Base Resin of Example 1 was mixed as follows:

| Base resin | 20.0 g |
|---|---|
| Cationic photoiniator (Cyracure 6974) | 1.2 g |
| Flow control agent (BYK 307) | 0.05 g |

Polycarbonate lens stock was provided with a conventional acrylic primer layer (see, e.g., Example 2, PCT/US97/07852, WO 97/45498), and the mixture was spin coated onto the primed polycarbonate lenses and cured in one pass through a UV Cure unit using a medium pressure mercury H bulb. Total exposure was 1.4 Joules.

The coating thickness was 4-5 microns, and had excellent adhesion according to ASTM D3359-02 (Standard Test Methods for Measuring Adhesion by Tape Test), using 3M 600 tape 1" wide, when tested both prior to and after soaking for 15 minutes in a dye bath at 95-100C, using black dye (available from Brain Power, Inc. ("BPI"), Miami, Fla.). The coating was also spin coated onto a primed polycarbonate panel and tested for abrasion resistance according to ASTM D1044-99 (Standard Test Method for Resistance of Transparent Plastics to Surface Abrasion), modified to use the CS10 wheels resurfaced using the S-11 re-facing disks, both from Taber Industries, 1000 cycles, 500 g. Haze value measured on a Hazegard Meter XL 211 from BYK Gardner was determined to be <1%.

Example 3

Base Resin with Acrylic Monomers

The Base Resin from Example 1 was mixed with acrylic monomers to form composition 3A as follows:

| Ingredient | amount (g) |
| --- | --- |
| Base resin | 20.0 |
| Diacrylate (HDODA) | 2.8 |
| Triacrylate (TMPTA) | 2.2 |
| Cationic photoinitiatore (Cyracure 6974) | 1.2 |
| Free radical initiator (Irgacure 184) | 0.5 |
| Flow control (BYK 307) | 0.05 |

The Base Resin from Example 1 was also mixed with the following acrylic monomers to form composition 3B as follows:

| Ingredient | amount (g) |
| --- | --- |
| Base resin | 20.0 |
| Diacrylate (HDODA) | 1.0 |
| Triacrylate (SR444) | 4.0 |
| Cationic photoinitiatore (Cyracure 6974) | 1.2 |
| Free radical initiator (DEAP) | 0.5 |
| Flow control (BYK 307) | 0.05 |

Samples of compositions 3A and 3B were spin coated onto flat, unprimed polycarbonate panels and cured as in example 2 to provide a film thickness of about 4.5 microns.

The abrasion resistance of cured composition 3A was determined in the manner above, using both CS10 wheels and C17 wheels at 1000 cycles, and provided results of <1% haze and between 6.5-8% haze, respectively. The adhesion of the composition was determined both before and after tinting, and showed excellent adhesion (scale 5B) in both cases. After immersion in a tint bath as above, percent transmission was determined to be 47.5%. The adhesion after this tint test when measured as above was excellent.

The abrasion resistance of cured composition 3B was determined with a CS10 wheel at 1000 cycles to provide 1-1.1% haze, and adhesion using the above-described tape test was excellent as well (5B), both pre- and post-tint, and transmission of 31% following immersion in a tint bath.

Samples of composition 3B were also spun onto a high refractive index lens (Essilor, RI 1.67), and demonstrated adhesion of 5B as well.

It can be seen that compositions of this invention, such as composition 3A above, can adhere very well to substrates having a high refractive index, which is an unusual and desirable quality for coating substrates such as optical lenses.

Examples 4, 5, 6 show the effect and usefulness of using diluents other than acrylic monomers.

Example 4

Non-silane Cycloaliphatic Epoxide

A composition was prepared using the following ingredients:

| Ingredient | amount (g) |
| --- | --- |
| Base resin | 20.0 |
| Cycloaliphatic epoxy resin (Uvacure 1502) | 5.0 |
| Cationic photoiniatror (Cyracure 6974) | 1.5 |
| Flow control (BYK 307) | 0.05 |

Samples were spin coated onto a flat primed polycarbonate panel and cured as in Example 2, after which they were subjected to the Taber Abrasion test using the CS 10 wheels, 500 cycles, 500 g. The resulting cured coating samples provided a haze value of 1.1 to 2.0%

Example 5

Oxetane Monomers

A composition was prepared using the following ingredients:

| Ingredient | amount (g) |
| --- | --- |
| Base resin | 20.0 |
| Oxetane monomer (Cyracure 6000) | 5.0 |
| Cationic photoinitiator (Cyracure 6974) | 1.5 |
| Flow control (BYK 307) | 0.05 |

Samples were spin coated on a flat polycarbonate panel and cured as in Example 2 to provide a film thickness of about 4 to 5 microns. When tested with the Taber Abrader using the CS 10 wheels (1000 cycles, 500 g), the haze was <1%.

Example 6

Vinyl Ether Monomers

A composition was prepared using the following ingredients:

| Ingredient | amount (g) |
| --- | --- |
| Base resin | 20.0 |
| Vinyl ether monomer (Vectomer 4010) | 5.0 |
| Cationic photoinitiator (Cyracure 6974) | 1.5 |
| Flow control (BYK 307) | 0.05 |

Samples were spin coated on a flat polycarbonate panel and cured as in Example 2 to give a film thickness of 4-5 microns. When tested with the Taber Abrader using CS 10 wheels (1000 cycles, 500 g), the haze was <1%.

Example 7

Effect of Varying Silica Content

The following compositions were prepared as in Example 1 in order to vary the silica content from 5-30% in the base resin as follows. The unhydrolysed epoxy silane was kept at a constant % in the final resin.

|                       | Comp A  | Comp B  | Comp C  |
|-----------------------|---------|---------|---------|
| Colloidal Silica (MA-ST) | 250.0 g | 250.0 g | 250.0 g |
| Silane (A1630)        | 16.3 g  | 16.3 g  | 16.3 g  |
| H₂O                   | 4.3 g   | 4.3 g   | 4.3 g   |

Each mixture was stirred at room temperature for 18-20 hours, after which the following were added:

|                          | Comp A (5% silica) | Comp B (20%) | Comp C (30%) |
|--------------------------|--------------------|--------------|--------------|
| Resin A from Example 1   | 211.8 g            | 123.7 g      | 53.7 g       |
| Non-hydrolyzed silane (A187) | 241.8 g        | 165.0 g      | 110.0 g      |

The pH was adjusted to 7.5-8.0 using concentrated NH₄OH and the volatiles were removed at 50-60C under reduced pressure. Viscosities were between 14 centipoise and 43 centipoise were measured on a Brookfield LVF viscometer at 25C.

Example 8

The compositions from above Example 7 were mixed as follows

| Ingredient | amount (g) |
|------------|------------|
| Composition from Example 7 | 20.0 |
| Diacrylate (HDODA) | 2.8 |
| Triacrylate (TMPTA) | 2.2 |
| Cationic photoinitiator Cyracure 6974 | 1.2 |
| Free radical initiator (Irgacure 184) | 0.5 |
| Flow control (BYK 307) | 0.05 |

Samples were spin coated onto flat unprimed polycarbonate panels and cured as in Example 2 to provide a film thickness of about 4 to about 5 microns. When tested for abrasion resistance using the Taber Abrader, CS 10 wheels (1000 cycles, 500 g) the haze values were as follows.

Composition A 1.3-1.8%
Composition B <1%
Composition C <1%

It can be seen that compositions of this invention provide improved abrasion resistance at a wide array of colloidal silica concentrations.

Example 9

Non-silane Epoxy Ether Monomers

A composition was prepared having the following ingredients:

| Ingredients | amounts(g) |
|-------------|------------|
| Base resin | 20.0 |
| Diacrylate (HDODA) | 3.0 |
| aliphatic polyol polyepoxy (Heloxy Modifier 48) | 4.0 |
| Photoiniator (Uvacure 6974) | 1.4 |
| Acetophenone (DEAP) | 0.3 |
| Flow control (BYK 307) | 0.05 |

The composition was spin applied to unprimed polycarbonate panels and cured as in Example 2 to a film thickness of 4-5 microns. As determined using the test methods above, the cured composition demonstrated tint at 31%, abrasion resistance (1000 cycles, 500 g) of 1.2-1.6, excellent adhesion (5B). As applied to a high refractive index lens (Essilor, RI 1.67) the cured composition also demonstrated excellent adhesion (5B).

Example 10

Highly Tintable Compositions

Compositions were prepared having the following ingredients:

| Ingredients | Comp A (g) | Comp B (g) |
|-------------|------------|------------|
| Base resin | 20.0 | — |
| Ex 1 Resin A (hydrolyzed silane only) | — | 20.0 |
| Diacrylate (HDODA) | 3.4 | 3.4 |
| Diacrylate (Sartomer SR-9209) | 2.3 | 2.3 |
| Vinyl ether (Vectomer 4010) | 2.3 | 2.3 |
| Photoinitiator (Irgacure 250) | 0.57 | 0.57 |
| Photoiniator (Cyracure 6974) | 0.92 | 0.92 |
| Acetophenone (DEAP) | 0.57 | 0.57 |
| Flow control (BYK 307) | 0.06 | 0.06 |

The compositions were spin applied to unprimed polycarbonate panels and cured as in Example 2 to a film thickness of 4-5 microns. As determined using the test methods above, the cured compositions demonstrated tint of 12.6 and 15.2 (Compositions A and B, respectively), abrasion resistance (1000 cycles, 500 g) of 6.7-7 and 9.9-11.1 (Compositions A and B, respectively), and excellent adhesion (5B). As applied to a high refractive index lens (Essilor, RI 1.67) the cured composition A also demonstrated excellent adhesion (5B), though by contrast, composition B demonstrated only poor to fair adhesion to such high RI substrates. The results of this Example demonstrate the manner in which colloidal silica plays an important role in improving properties, including for use on high RI lenses.

What is claimed is:

1. A coating composition for forming a transparent, abrasion-resistant coating upon a substrate, the composition comprising:
   A. the hydrolysis product of an epoxy functional alkoxy silane,
   B. a curing agent comprising a cationic photoinitiator for polymerizing epoxy compounds,
   C. a viscosity-reducing amount up to 50% by weight, solids basis, of a monomeric (silanol free) epoxy functional epoxy silane, and
   D. colloidal silica present in an amount sufficient to improve abrasion resistance as compared to a composition lacking the colloidal silica.

2. A composition according to claim 1 further comprising one or more polymerizable monomers.

3. A composition according to claim 2 wherein the monomers are selected From the group consisting of ethylenically unsaturated monomers, non-silane epoxies, oxetanes, alkylalkoxysilanes or tetraalkoxysilanes, vinyl ethers, and non-silane cycloaliphatic epoxies.

4. A composition according to claim 1 further comprising a silane coupling agent.

5. A composition according to claim 4, wherein the agent comprises methyltrimethoxysilane (MTMS).

6. A composition according to claim 1 further comprising one or more polymerizable monomers and a silane coupling agent.

7. A composition according to claim 1 wherein the composition can be cured to provide a coating that exhibit an improved combination of abrasion-resistance and hardness as compared to a coating lacking the colloidal silica.

8. A composition according to claim 7 wherein the composition is prepared by providing and blending together parts A, C and D, followed by distillation to remove solvents, after which a cationic initiator B is incorporated and the composition can be photocured.

9. A composition according to claim 1 wherein the composition further comprises a polymerizable monomer and a silane coupling agent.

10. A composition according to claim 9 wherein
a) the epoxyfunctional alkoxy silanes of parts A and D are independently prepared from the group consisting of glycidoxymethyl-trimethoxysilane, glycidoxymethyl-triethoxysilane, glycidoxymethyl-tripropoxysilane, glycidoxymethyl-tributoxysilane, β-glycidoxyethyltrimethoxysilane, β-glycidoxyethyltriethoxysilane, β-glycidoxyethyl-tripropoxysilane, β-glycidoxyethyl-tributoxysilane, β-glycidoxyethyltrimethoxysilane, α-glycidoxyethyl-triethoxysilane, α-glycidoxyethyl-tripropoxysilane, α-glycidoxyethyltributoxysilane, γ-glycidoxypropyl-trimethoxysilane, γ-glycidoxypropyl-triethoxysilane, γ-glycidoxypropyl-tripropoxysilane, γ-glycidoxypropyltributoxysilane, β-glycidoxypropyl-trimethoxysilane, β-glycidoxypropyl-triethoxysilane, β-glycidoxypropyl-tripropoxysilane, β-glycidoxypropyltributoxysilane, α-glycidoxypropyl-trimethoxysilane, α-glycidoxypropyl-triethoxysilane, α-glycidoxypropyl-tripropoxysilane, α-glycidoxypropyl-tributoxysilane, γ-glycidoxybutyl-trimethoxysilane, δ-glycidoxybutyl-triethoxysilane, δ-glycidoxybutyl-tripropoxysilane, δ-glycidoxybutyl-tributoxysilane, δ-glycidoxybutyl-trimethoxysilane, γ-glycidoxybutyl-triethoxysilane, γ-glycidoxybutyl-tripropoxysilane, γ-propoxybutyl-tributoxysilane, δ-glycidoxybutyl-trimethoxysilane, δ-glycidoxybutyl-triethoxysilane, δ-glycidoxybutyl-tripropoxysilane, α-glycidoxybutyl-trimethoxysilane, α-glycidoxybutyl-triethoxysilane, α-glycidoxybutyl-tripropoxysilane, α-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexy)butyl-triethoxysilane, (3,4-epoxycyclohexyl)-butyl-tripropoxysilane, and (3,4-epoxycyclohexyl)butyl-tributoxysilane.

11. A composition according to claim 10 wherein the composition, when cared upon a polymeric substrate, provides improved abrasion resistance as compared to a composition lacking the colloidal silica.

12. A composition according to claim 1 wherein the composition is adapted to be cured on a polymeric surface to provide abrasion resistance (delta haze) of less than about 10%, when determined by Taber resistance, at 1000 cycles with a 500 g load.

13. A composition according to claim 12 wherein the abrasion resistance is less than about 5%.

14. A composition according to claim 13 wherein the abrasion resistance is less than about 2%.

15. A composition according to claim 1 wherein the ethylenically unsaturated monomer comprises an acrylic monomer.

16. A composition according to claim 15 wherein the acrylic monomer has an acrylic functionality not greater than two.

17. A composition according to claim 1 wherein the composition is provided in cured form upon a polymeric surface.

18. A composition according to claim 17 wherein the composition provides abrasion resistance (delta haze) of less than about 10%, when determined by Taber resistance, at 1000 cycles with a 500 g load.

19. A composition according to claim 18 wherein the abrasion resistance is less than about 5%.

20. A composition according to claim 19 wherein the abrasion resistance is less than about 2%.

21. A method of providing an abrasion resistant coating to a polymeric substrate, the method comprising the steps of providing a coating composition according to claim 1, and curing the composition on the surface.

22. A method according to claim 21 wherein the substrate comprises an optical lens.

23. A polymeric substrate coated according to the method of claim 21.

24. An optical lens coated according to the method of claim 22.

25. A composition according to claim 1 wherein the composition is substantially free of volatile solvents.

* * * * *